United States Patent [19]

Rinkleib

[11] 4,286,298

[45] Aug. 25, 1981

[54] PRELOADED HEAD ARM ASSEMBLY

[75] Inventor: Helfried O. Rinkleib, Tucson, Ariz.

[73] Assignee: International Business Machines Corporation, Armonk, N.Y.

[21] Appl. No.: 103,966

[22] Filed: Dec. 17, 1979

[51] Int. Cl.³ .................. G11B 21/24; G11B 21/08
[52] U.S. Cl. ................................. 360/109; 360/106
[58] Field of Search ............... 360/104, 106, 103, 78, 360/109

[56] References Cited

U.S. PATENT DOCUMENTS

| 3,051,954 | 8/1962 | Osterlund | 360/103 |
| 3,268,877 | 8/1966 | Hagen | 360/103 |
| 4,196,456 | 4/1980 | Manzke et al. | 360/106 |

OTHER PUBLICATIONS

Dickie et al., "Disc File Actuator", IBM Tech. Disc. Bull., vol. 18, No. 10, Mar. 1976, p. 3435.

Primary Examiner—Robert S. Tupper
Attorney, Agent, or Firm—Nathan N. Kallman

[57] ABSTRACT

A preloaded head arm assembly comprises a lightweight, low inertia frustoconical arm support to which a magnetic head is mounted at one end. The other end of the head arm support is coupled to an end of a rotatable shaft, on which the arm support can be pivoted. An electrical coil which is disposed within a magnetic field supplied by permanent magnet means is fastened to the other end of the shaft. The pivotable magnetic head arm assembly may be vertically adjusted to control flying height and angularly adjusted relative to the surface of a magnetic disk to correct for azimuth variations.

3 Claims, 2 Drawing Figures

PRELOADED HEAD ARM ASSEMBLY

DESCRIPTION

1. Technical Field

The invention relates to a magnetic head arm assembly and in particular to a preloaded accessing head arm assembly which is adjustable relative to a magnetic disk surface.

An object of this invention is to provide a novel improved magnetic head arm assembly configuration.

Another object of this invention is to provide a magnetic head arm assembly which lends itself to easy adjustments.

Another object is to provide a magnetic head arm assembly in which the arm support is lightweight and has low inertia, thereby affording rapid accessing to data.

2. Background Art

In disk files which use accessing magnetic heads to record and read data from magnetic disks, rapid access to data tracks and with precise positioning over a selected track are highly desirable. With high data densities, it is necessary to maintain the head transducer very close, in pseudo-contact with a rotating disk, without significant variation in spacing between the transducer and disk surface. Also, if pivotable or arcuate head arm accessing is employed, as opposed to linear radial accessing, then the azimuth of the head transducer relative to the track must be properly maintained to avoid signal distortion or loss. The shape and weight of the head arm assembly and its relation to the actuator are important factors for ensuring rapid access with minimal vibration or resonance and with proper accuracy.

BRIEF DESCRIPTION OF THE DRAWING

The invention will be described in detail with reference to the drawing in which.

DISCLOSURE OF THE INVENTION

Figure 1:
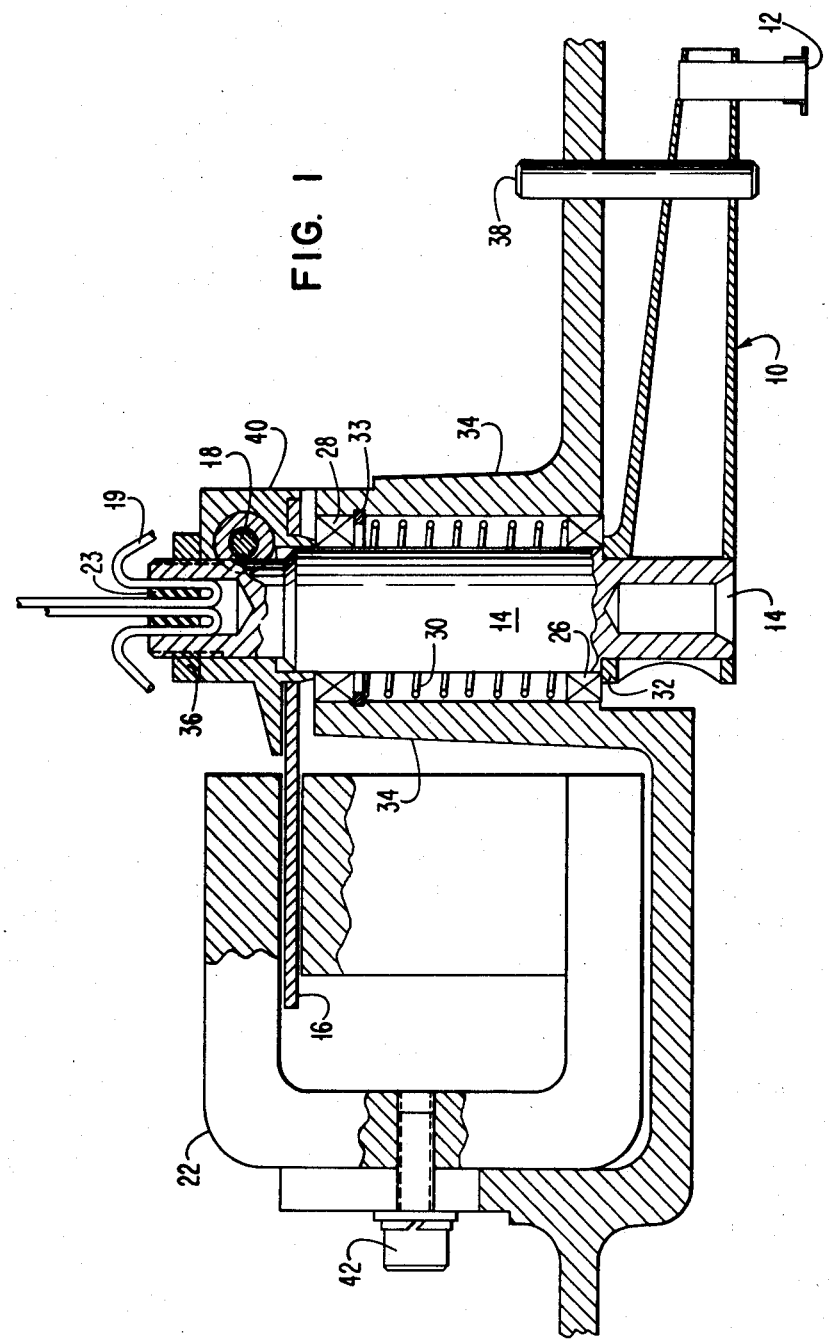
FIG. 1 is an elevational sectional view of a magnetic head arm assembly, made in accordance with this invention.
Figure 2:
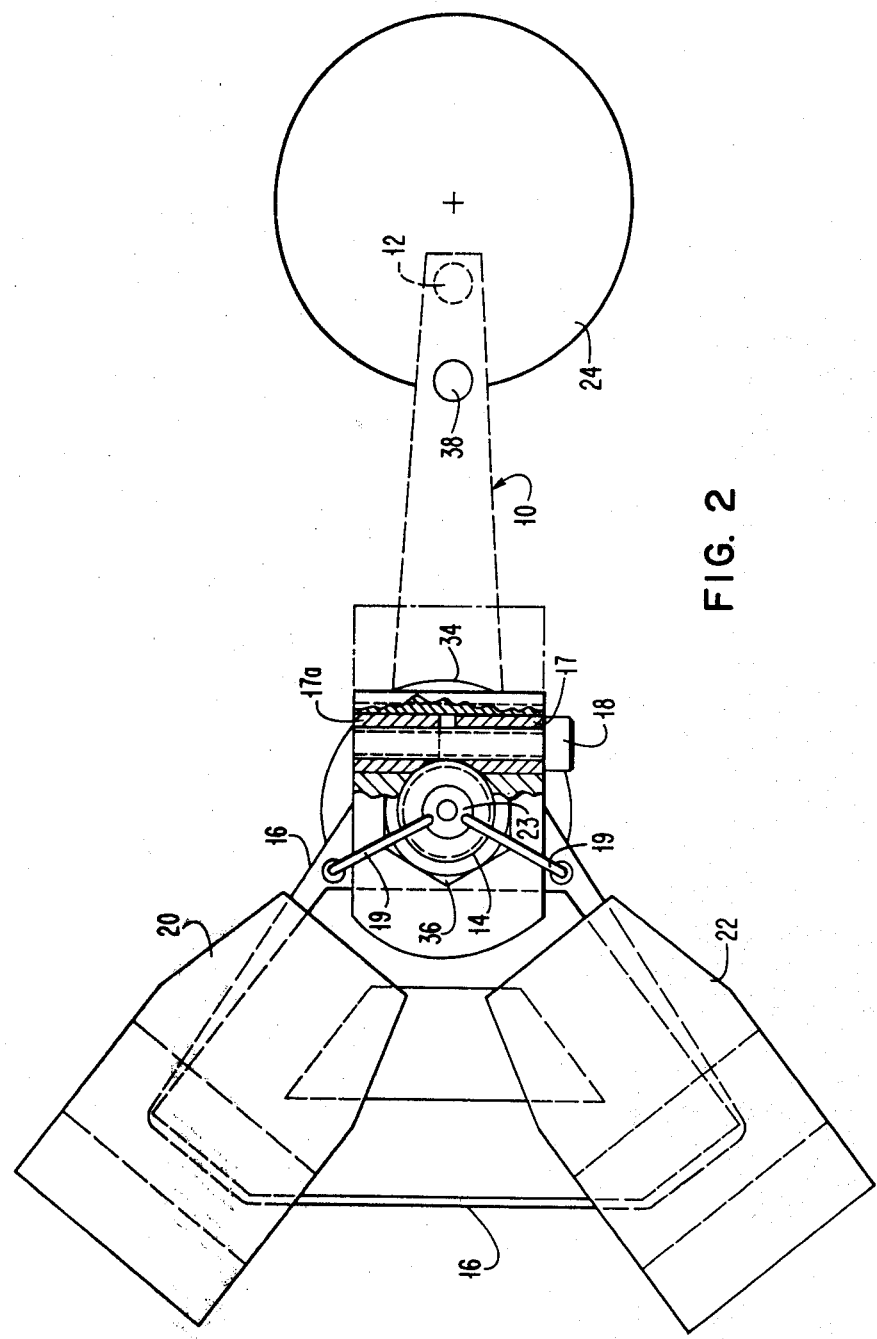
FIG. 2 is a top view of the head arm assembly.

With reference to FIGS. 1 and 2, an embodiment of a magnetic head arm assembly made in accordance with this invention includes a frustoconical pivotal head arm 10, which is formed with thin walls, made of aluminum for example, and is hollow. The arm walls vary in thickness as they progress from the base portion of the structure to the narrow apex portion, which is relatively thinner. A magnetic transducer 12 is mounted at the tapered end or apex of the arm 10. The other end of the arm, which is the base of the frustoconical geometry, is coupled to one end of a rotatable shaft 14.

At the other end of the shaft 14, an electrical coil 16 is fastened by means of a clamping device 17 and 17a, which is held in position by a clamp screw 18. A cable 19 leads from the coil to a current supply which may be associated with a controller or data processor. A rubber grommet 23 centers the cable relative to the center pivot point, thus minimizing drag which would occur with the motion of the coil 16. The electrical coil receives current of a given magnitude and direction from the current supply, which causes the coil to be actuated within a magnetic field supplied by adjacent permanent magnets 20 and 22. In this way, the coil can be pivoted between the two permanent magnets. The pivoting action of the coil rotates the shaft 14, thereby causing an arcuate movement of the arm 10, so that the transducer 12 is transported from data track to data track registered on the surface of a rotating magnetic disk 24.

A floating bearing 26 and a fixed bearing 28 are mounted to the shaft 14. The bearings are separated by a compression spring 30 that is seated around the shaft 14 and which acts to preload the bearings. The floating bearing 26 is seated on a shoulder 32 which retains the bearing within a housing 34. A clip ring 33 functions to maintain the fixed bearing in position. The cast housing 34 encloses the shaft and bearings and provides a reference frame for assembling the several components of the magnetic head arm assembly.

To preload the head arm assembly and make the adjustments necessary to orient the head arm and transducer so that they will be in proper relationship to the surface of a rotating magnetic disk, a first angular adjustment for azimuth is performed. Since the azimuth angle of the head will vary from track to track of the disk surface, the head arm 10 is moved to a predetermined center location of the arcuate pivot path of the head arm 10. To achieve the correct alignment of the coil 16 with respect to the permanent magnets 20 and 22, a pin 38 is thrust through a bore of the cast housing 34 and through a bore formed in the head arm to maintain the arm at the center location while further adjustments are made.

The next adjustment is a vertical adjustment of the shaft 14, which is accomplished by rotating an adjusting nut 36 that causes a collar 40 to translate axially relative to the shaft so that the compression of the spring 30 is varied. By varying spring compression, the head arm is moved up or down until the desired height position is attained. At this point, the clamp screw 18 is tightened against the clamp 17 and 17a.

In addition, the permanent magnets 20 and 22 are positioned, by means of an adjusting screw 42, with relation to the coil 16 which has been aligned relative to the shaft 14. After all the adjustments have been finally made, the pin 38 is removed from the bores of the housing and the arm, so that the head arm may rotate freely in response to the pivoting action of the coil 16.

The magnet head arm assembly of this invention affords a lightweight arm structure having low inertia for accessing data rapidly. The preloaded arm assembly ensures proper azimuth and a relatively stable flying height of the head and transducer with respect to a disk surface. Positioning of the electrical coil actuator and spaced permanent magnets, which constitute a voice coil motor, are adjusted for optimum alignment relative to the rotatable shaft to which the head arm assembly is mounted. The assembly is relatively low in cost, easy to maintain and allows simple adjustment of the several parts to realize precise alignment and orientation.

What is claimed is:

1. A magnetic head arm assembly comprising:
   a frustoconical hollow head arm having a base at one end and a narrowed apex at the other end, the thickness of the walls of said arm being tapered from said base to said apex;
   means formed in said arm at said base for mounting said arm to an actuator;
   a magnetic transducer mounted to said arm at said apex;
   a rotatable shaft to which said head arm is mounted;
   a fixed bearing attached at one end of said shaft;

a floating bearing coupled at the other end of said shaft adjacent to said head arm for enabling vertical adjustment of said rotatable shaft;
a compression spring coupled to said shaft and disposed between said bearings; and
an adjusting nut for varying the compression of said spring to move and adjust the vertical position of said shaft and said head arm.

2. A head arm assembly as in claim 1, including a clamp and a clamp screw for maintaining the adjustment of said shaft relative to said head arm.

3. A head arm assembly as in claim 1, including an electrical coil mounted to said shaft; and first and second permanent magnets disposed in spaced and fixed relation to said shaft for providing a magnetic field to encompass said coil, and for moving said coil arcuately in response to electrical current applied to said coil.

* * * * *